US007072457B2

(12) United States Patent
Brown et al.

(10) Patent No.: US 7,072,457 B2
(45) Date of Patent: Jul. 4, 2006

(54) TRANSFERRING A CALL TO A BACKUP ACCORDING TO CALL CONTEXT

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/022,164

(22) Filed: Dec. 17, 2001

(65) Prior Publication Data

US 2003/0112956 A1    Jun. 19, 2003

(51) Int. Cl.
  *H04M 3/42* (2006.01)
(52) U.S. Cl. ............................ 379/211.01; 379/215.01; 379/219; 379/115.01
(58) Field of Classification Search .......... 379/114.04, 379/115.01, 219, 211.01, 215.01
See application file for complete search history.

(56) References Cited

U.S. PATENT DOCUMENTS

| 5,018,191 A * | 5/1991 | Catron et al. ........... 379/100.09 |
| 5,206,901 A * | 4/1993 | Harlow et al. .......... 379/211.04 |
| 5,276,731 A * | 1/1994 | Arbel et al. ............ 379/211.02 |
| 5,487,111 A * | 1/1996 | Slusky ................... 379/211.03 |
| 5,499,288 A | 3/1996 | Hunt ............................ 379/88 |
| 5,673,404 A | 9/1997 | Cousins et al. .............. 395/347 |
| 5,790,637 A | 8/1998 | Johnson et al. ................ 379/67 |
| 5,915,001 A | 6/1999 | Uppaluru ................. 379/88.22 |
| 5,940,476 A | 8/1999 | Morganstein et al. .... 379/88.02 |
| 5,946,654 A | 8/1999 | Newman et al. ............ 704/246 |
| 6,038,305 A | 3/2000 | McAllister et al. ......... 379/207 |
| 6,058,364 A | 5/2000 | Goldberg et al. ........... 704/252 |
| 6,091,968 A * | 7/2000 | Koohgoli et al. ........... 455/557 |
| 6,101,242 A | 8/2000 | McAllister et al. ...... 379/88.02 |
| 6,122,357 A | 9/2000 | Farris et al. ................ 379/207 |
| 6,178,230 B1 | 1/2001 | Borland ..................... 379/67.1 |
| 6,373,817 B1 * | 4/2002 | Kung et al. ................. 370/217 |
| 6,529,585 B1 * | 3/2003 | Ng et al. .................. 379/88.03 |
| 2002/0090074 A1 * | 7/2002 | Sbisa et al. ............ 379/221.09 |

(Continued)

FOREIGN PATENT DOCUMENTS

EP          0585004 A2       3/1994

(Continued)

OTHER PUBLICATIONS

WPAT Derwent 1994-067503.

(Continued)

*Primary Examiner*—Ahmad F. Matar
*Assistant Examiner*—Quynh H. Nguyen
(74) *Attorney, Agent, or Firm*—John Biggers; Mark S. Walker; Biggers & Ohanian, LLP

(57) ABSTRACT

A method, system, and program for transferring a call to a backup according to call context are provided. A context for a call from a caller to an intended callee is detected. An intended party backup profile is accessed that indicates multiple backup parties designated by the intended callee. At least one backup party is automatically selected from among the multiple backup parties according to the context for the call. The call may be automatically forwarded to at least one backup party if the intended callee has currently elected to forward calls. Alternatively, after detecting that the intended callee is unavailable, the call may be automatically transferred to at least one backup party.

68 Claims, 7 Drawing Sheets

U.S. PATENT DOCUMENTS

2002/0118807 A1    8/2002    Pedersen

FOREIGN PATENT DOCUMENTS

| EP | 0676882 A2 | 10/1995 |
| JP | 8139797 A | 5/1996 |
| JP | 10294784 A | 11/1998 |

OTHER PUBLICATIONS

WPAT Derwent 1995-346415.
WPAT Derwent 1996-315499.
WPAT Derwent 1999-031530.

* cited by examiner

TRANSFERRING A CALL TO A BACKUP ACCORDING TO CALL CONTEXT

CROSS-REFERENCE TO RELATED APPLICATIONS

The present application is related to the following co-pending applications:
(1) U.S. patent application Ser. No. 10/015,381;
(2) U.S. patent application Ser. No. 10/015,281;
(3) U.S. patent application Ser. No. 10/015,265;
(4) U.S. patent application Ser. No. 10/015,282;
(5) U.S. patent application Ser. No. 10/015,280;
(6) U.S. patent application Ser. No. 10/022,160;
(7) U.S. patent application Ser. No. 10/022,158;
(8) U.S. patent application Ser. No. 10/022,161;
(9) U.S. patent application Ser. No. 10/022,624;
(10) U.S. patent application Ser. No. 10/015,267;
(11) U.S. patent application Ser. No. 10/022,163.

BACKGROUND OF THE INVENTION

1. Technical Field

The present invention relates in general to telecommunications and, in particular, to voice identification. Still more particularly, the present invention relates to identifying a backup for a call according to the call context.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Messaging systems have developed that answer a line after a set number of rings or a designated period of time. An answering machine device may connect to a telephone device to answer incoming calls. Alternatively, an answering machine service, provided by a telephone service provider, answers the call and provides options for a caller to leave a message in a voice mail box or through text messaging, for example.

Within private telephone switching systems, each telephony device may be provided with buttons or other selection options that an individual may utilize to select a reason the caller is unavailable. An operator attempting to connect a caller to that individual will receive the unavailable signal and reason for unavailability, such that the operator may then switch the caller to a voice mail box or to another available employee.

An advantage of messaging systems within a private telephone switching system is that an individual may provide a message to callers that indicates a backup in the case that the caller needs to talk with an someone rather than leaving a message. Additionally, within a private telephone switching system, callers are typically provided with the option of pressing A0" during the message to have the call transferred to the operator or an assistant.

However, a limitation of messaging systems within a private telephone switching system is that a backup accessible according by pressing A0" or another entry is limited to a line number accessible within the private telephone switching system. A single backup within a private telephone switching system is limited because callers may try to reach an individual at a business line within a private switching system concerning non-business matters, where the individual's backup within the company is not helpful. While the individual may provide a message to callers that details a backup and telephone number of that backup for non-business matters, the caller is then required to end the call and dial the number of that backup.

A limitation of messaging systems in general is that an individual typically cannot designate a backup unless the line number is connected to a private telephone switching system. An individual may indicate in an entry message that names and phone numbers of backups for the caller. However, an individual typically records one message that is played for all incoming calls, where that message will then reveal those names and numbers to any caller reaching the messaging system.

Forwarding services allow an individual to select a line number to which incoming calls are automatically forwarded. Forwarding systems allow an individual to have calls follow them to the line number most accessible to the caller. Alternatively, an individual may forward calls to a line number accessible to a backup for the individual. However, forwarding systems are limited in that only a single line may be selected for forwarding calls to, regardless of the context of the call. This limitation is apparent where an individual selects to forward calls from a business line to a colleague's business line. A personal call made to the individual's business line will be forwarded to the colleague, rather than transferred to a messaging system.

Therefore, in view of the foregoing, it would be advantageous to provide a method, system, and program for providing a backup for calls, whether or not the line number is managed by a private telephone switching system. In addition, it would be advantageous to provide a method, system, and program for providing multiple single entry backup selections for a call. Morever, it would be advantageous to provide a method, system, and program for automatically forwarding a call to a backup or automatically transferring the call when the individual is unavailable, where that backup is automatically selected based on the context of a call.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for identifying a backup for a call according to the call context.

According to one aspect of the present invention, a context for a call from a caller to an intended callee is detected. An intended party backup profile is accessed that indicates multiple backup parties designated by the intended callee. At least one backup party is automatically selected from among the multiple backup parties according to the context for the call. The call may be automatically forwarded to at least one backup party if the intended callee has currently elected to forward calls. Alternatively, after detecting that the intended callee is unavailable, the call may be automatically transferred to at least one backup party.

In particular, a trusted telephone network preferably processes the call and initiates a context inference service to identify the context of a call. The context inference service may be initiated locally within the trusted telephone network or at a server located outside the trusted telephone network, with additional security applied for the communication channel.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
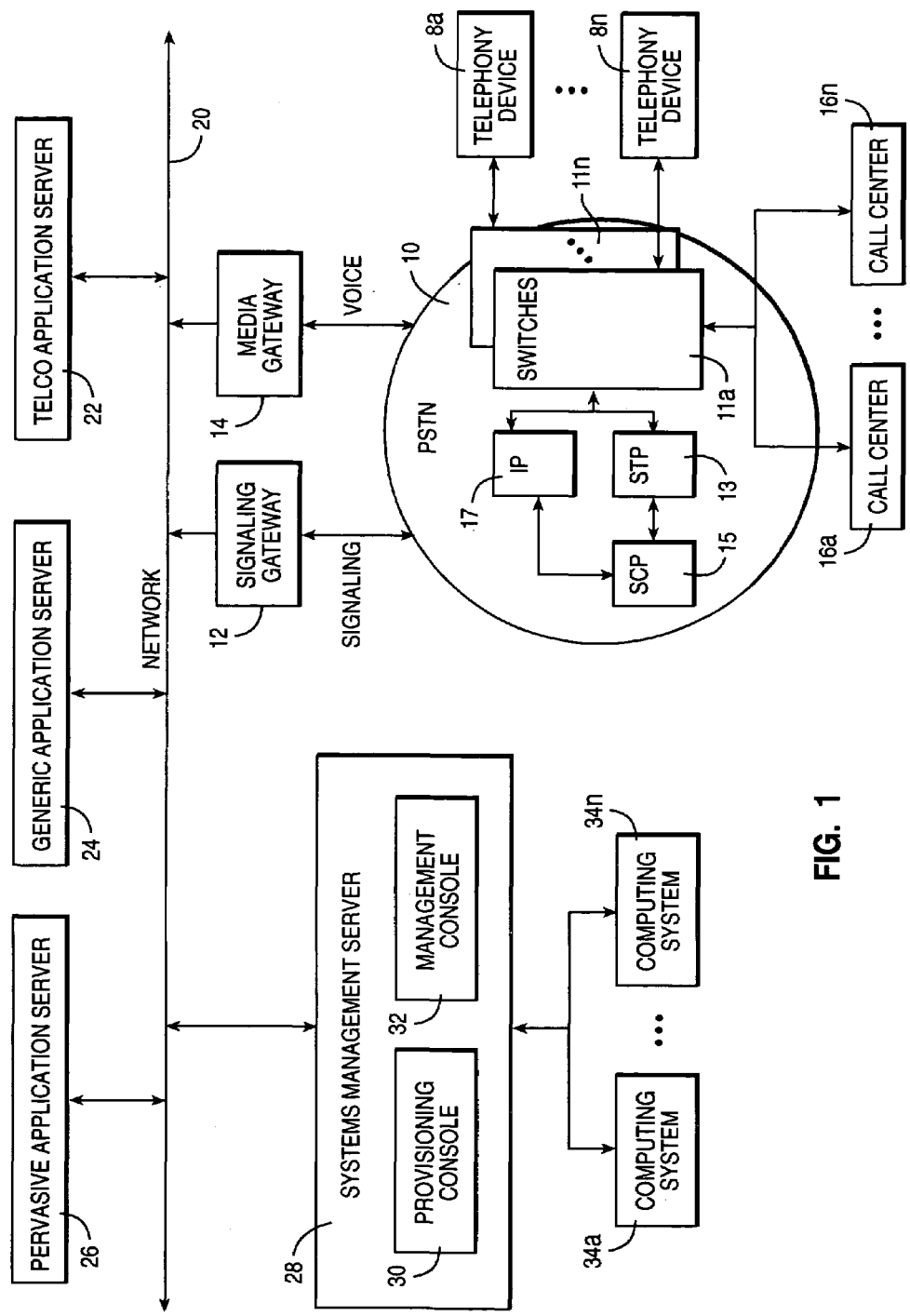
FIG. 1 depicts a block diagram of a network environment in which the present invention may be implemented.

A method, system, and program for identifying a backup for a call according to the call context are provided. For purposes of the present invention, context may include, but is not limited to, the identity of the caller or callee, the device identity and owner, the location of the caller and callee, the path of a call, and billing information for the caller and callee. Location of the caller and callee may include, but is not limited to, the time zone, country, state, city, building location, or GPS location of a caller or callee.

For purposes of the present invention, a backup may include, but is not limited to, a line number, a backup identity, a messaging service, a forwarding service, a private switching system operator, an instant messaging system, a text messaging system, and a web page address. In addition, other types of backups may be selected by an individual.

The present invention is preferably performed by a context inference service located within an Intelligent Peripheral of the trusted telephone network and/or located within a Telco Application service outside the trusted telephone network. As will be further described, the Telco application service located outside the trusted telephone network is enabled to provide services to callers and callees via enhanced security channels.

The identity of the caller is preferably authenticated and utilized by the context inference service to determine a backup when the intended callee is unavailable. In particular, a callee may be associated with a dialed line number. Alternatively, the caller may enter the intended callee identity. Further, an messaging service that answers the call may provide the caller with the option to select from at least one callee, where the messaging service then switches the call to a context based backup for the intended callee. Preferably, whatever the case, a backup profile for the intended callee is accessed, where the backup profile includes backup preferences according to the context of the call.

In particular, the context inference service may automatically determine a context backup for the call and forward the call to the context backup if the intended callee has requesting that calls be forwarded. In addition, the context inference service may automatically determine the context backup for the call and transfer the call to that backup if the intended call is determined to be unavailable. Alternatively, a caller may be prompted to select a context backup, where each context backup is selectable by the caller by a single keypad or voice entry, such as A1@. The context inference service then forwards or transfers the call to the line number associated with the selected backup.

The identity of the callee answering the call is also preferably authenticated. In particular, since the call is being transferred from the intended callee, it is particularly advantageous to identity the party answering the call for the caller.

Identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may access a third party or external server to perform the identity authentication. Performance of identity authentication has different advantages depending on the device initiating the identity authentication.

While in the present invention, authentication of a caller or callee identity is described with emphasis placed on voice authentication, other methods of caller and callee identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee.

Other context information is received, determined and inferred from context clues. Context clues may include the identities of the caller and callee, the line numbers, the line subscriber profiles, caller/callee profiles, and other parameters associated with the call. As a call is transferred and forwarded, context clues for each portion of a call path are gathered and utilized to update the context of the call.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11*a*–11*n*, that originate, terminate, or tandem calls. Central office switches 11*a*–11*n* utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11*a*–11*n* query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11*a*–11*n* may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11*a*–11*n* and telco application server 22 via signaling gateway 12. In addition, a voice channel is opened between central office switches 11*a*–11*n* and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11*a*–11*n*, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers.

In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to transfer the call if appropriate, to apply distinctive ringing, etc.

In the present invention, authentication of the identity of the caller is preferably initiated in IP 17 or telco application server 22. Once a VID for a caller is received at a central office switch, a context inference application is initiated in IP 17 or telco application server 22. The context inference service preferably requests a caller profile according to VID to determine billing information and personal information about the caller. In addition, the context inference service preferably determines the identity of the device utilized by accessing a device directory, prompting the caller to indicate the device identity, or other methods. Further, the location of the device may be inferred from information provided by the central office switch originating the call, a GPS location, and the location assigned to a line number. Other context information, such as the subject matter of a call and the role in which a caller is placing the call, are preferably determined as wel. The context information is preferably loaded with the VID at the central office switch.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, in the present invention, the context information is forwarded with a caller VID to the callee device. The callee is enabled to determine whether to answer a call, transfer the call to voice mail, or select from other call handling options, based on knowing the identity of the caller and the context of the call.

In particular, the caller may provide the line number requested and/or may enter an identifier for the intended callee. A search engine may be accessed within IP 17 or telco application server 22 that queries at least one device associated with a callee to attempt to locate the intended callee. A callee profile accessible according to the intended callee identity may include line number subscriptions and recently used line numbers, such that the search engine may query those line numbers to locate the intended callee.

For purposes of the present invention, it is assumed that the intended callee is not available, or that the intended callee cannot answer all the caller's questions. Therefore, the context inference service within IP 17 or telco application server 22 determines a context based backup for the call and transfers the call to the context based backup.

In addition, authentication of the identity of a callee answering the call is preferably initiated in IP 17 or telco application server 22. Once a RVID for a callee is received at a central office switch, a context inference application is initiated in IP 17 or telco application server 22 to determine the context of the callee side of a call. The callee context information is preferably filtered according to callee preferences and transferred to the caller, such that the caller is provided with an identity of the callee.

As a call is forwarded or transferred to other callers and callees, IP 17 or telco application server 22 are preferably initiated to update the context for a call. For example, the context may indicate the path of line number accessed in a call and whether the call was transferred or forwarded.

Figure 2:
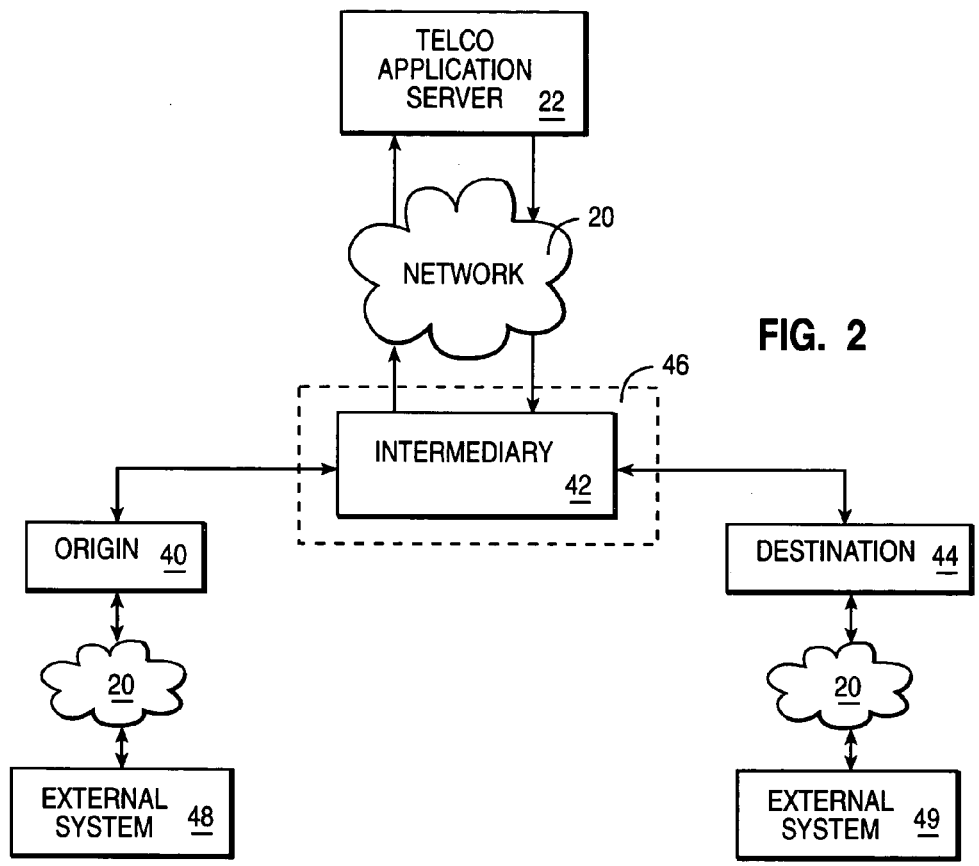
FIG. 2 illustrates a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In particular, in the present invention, both the identity of an intended callee and the identity of an accessed callee may be determined in RVIDS. The intended callee RVID may be authenticated, for example, from a messaging system utilized by the callee.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference services that perform context inference services. A context inference service may utilize context information gathered from multiple databases and may gathered context information directly from a caller or callee in response to prompts.

Context may include, but is not limited to, an intended callee, a subject matter of a call, a device identity, the location of an origin or destination device, billing information, service subscriptions, the path of a call, and other information which may provide a caller or callee with context of a call. Information for determining the context of a call may be gathered from a caller or callee profile, from routing information utilized by intermediary 42 from a device directory, from systems management server 28, or other databases of information. The context inference service may, for example, infer the subject matter of a call as either business or personal based on the identity of the device from which a call originates and the location of that device. Alternatively, the subject of a call as either a business subject or personal subject may be inferred from the billing information context.

A VID or RVID may be transferred in multiple protocols, including, but not limited to, Interface Definition Language (IDL). A VID or RVID may include a range of information, where each type of information may be tagged or identified in some other manner. For example, the following tagged VID may be transmitted to represent an authenticated identity of a caller and context of the call:

[caller name] Jon Smith
[caller device] Jane Doe's cell phone
[caller location] Central Time zone, Austin, Tex.
[call subject] Project A
[call billing] Jon Smith's business service provider C
[intended callee name] Margie Heart
[backup callee name] Mark Jones
[authenticated by] Jane Doe's cell phone, service provider C In another example, the following tagged RVID may be transmitted to the caller to represent an authenticated identity of a callee and the context of the call, including the path of the call:

[backup callee name] Albert Jones
[device] Albert Jones' home phone
[location] Dallas, Tex.
[path] call forwarded from 101-304-0000 to 214-333-1111

Figure 3:
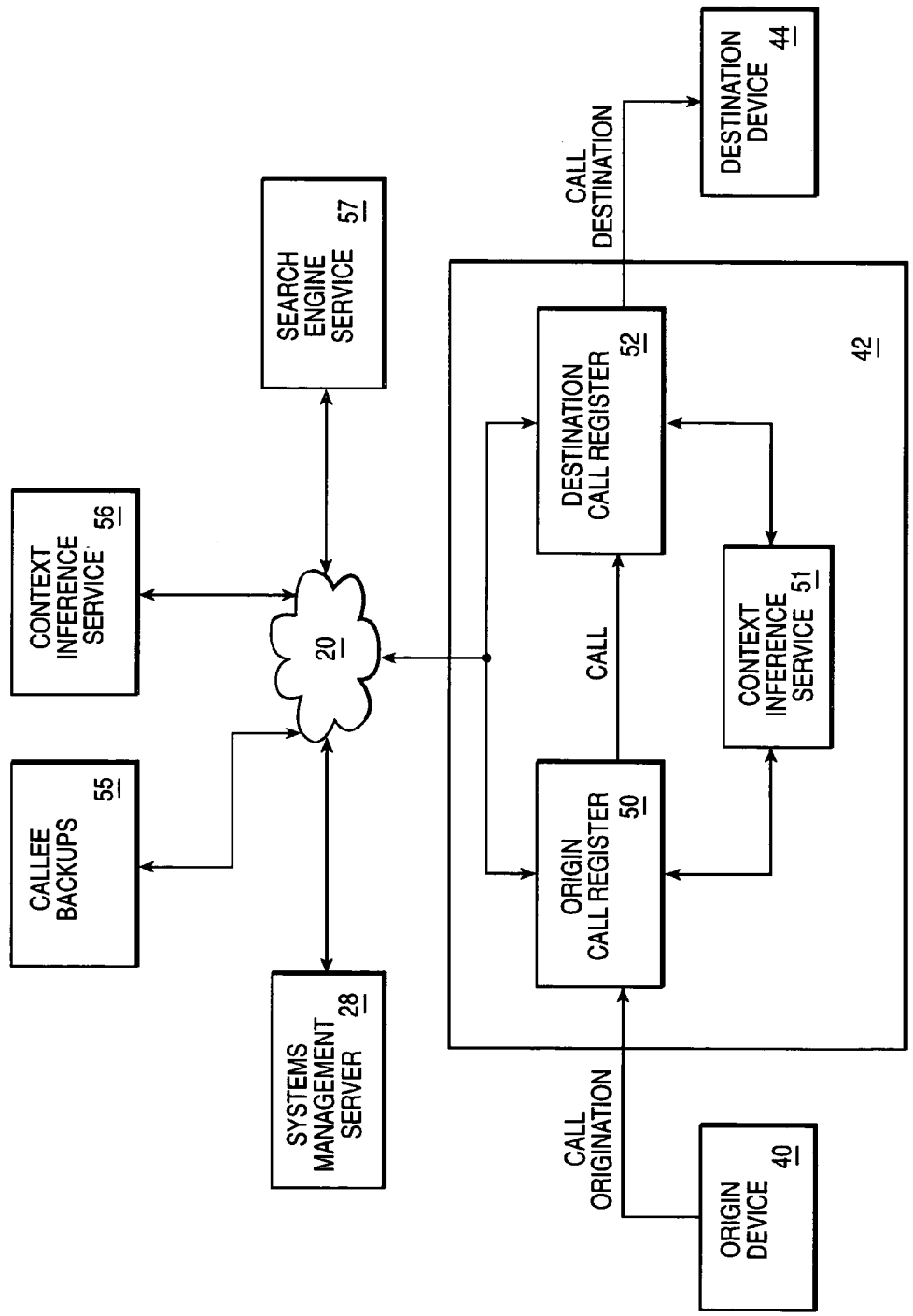
FIG. 3 depicts a block diagram of the flow of a call through a context inference system in accordance with the method, system, and program of the present invention.

With reference now to FIG. 3, there is depicted a block diagram of the flow of a call through a context inference system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service 51 may be located within trusted telephone network 46 as an IP. Alternatively, a context inference service 51 may be located outside trusted telephone network 46 within a telco application server accessible via network 20.

The context inference service preferably determines context for a call including, but not limited to, who is calling, an intended callee, the device utilized to place the call, the location of the caller, the billing method for the call, the path of the call, and/or the subject matter of the call. In addition, the context inference service preferably determines context for a call including, but not limited to, who receives a call, the path of line numbers utilized to access the callee, the device utilized to receive the call, the location of the callee, and the subject matter available for discussion by the callee. In addition, other categories of context may be determined.

To determine the context of the device utilized to place a call, the entity subscribing to the line number and/or an identifier for the device are preferably accessed. The first set of context clues is provided to the context inference service by the line subscriber profile. In particular, a line subscriber profile indicates the individual or business that subscribes to a particular line number. Further, a line subscriber profile may indicate that a business subscribes to a telephone service, but provide that service is subscribed to for use by a particular employee or group of employees.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call. The caller profile provides further context based on the billing information and service subscriptions of the caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference service may infer the subject matter of a call based on the caller's schedule. The context inference service may also infer the subject matter of a call based on the caller's business or the business associated with the line number utilized by the caller.

In addition, a caller profile may include multiple roles that a caller takes. For example, a caller may be a parent, a business person, a coach, and a volunteer. The context inference service may infer which role the caller is taking depending on other context or may prompt the caller to select a role. Further, the caller may select, at origin device 40, a role for the call when placing the call request.

Advantageously, in the present invention, at least one backup callee may be determined for the intended callee according to the call context. A caller preferably provides a line number and/or an intended callee identity when placing a call request. Where a line number alone is provided, then the line subscriber profile preferably indicates backups for the line. Where a line number and intended callee identity are provided, then the intended callee profile preferably indicates backups for the callee, such as callee backups 55. Callee backups 55 may be loaded into context inference service from a data storage system outside or inside trusted telephone network 46.

In particular, callee or line subscriber backups preferably designate at least one backup party to receive the call if the intended callee is unavailable. The context inference service preferably selects at least one backup party from those available according to the context of the call. For example, if the call is from a client the context of the call indicates the relationship between the client and the intended callee, such that a business partner is selected as the backup for the call.

In the present invention, a caller may provide an intended callee identity, in lieu of a requested line number. In that case, intermediary device 42 preferably initiates a search engine service, such as search engine service 57 which is accessible within a telco application server. Alternatively, the search engine service may be located in an Intelligent peripheral within trusted telephone network 46.

Search engine 57 preferably queries at least one telephony device at which the intended callee may be available. For example, the search engine may query the telephony device in association with the intended callee RVID was most recently detected. In addition, the search engine may query those lines to which the intended callee is a subscriber. Further, search engine 57 may query other line numbers that the intended callee may be available at as determined for a schedule within the profile of the intended callee.

If search engine 57 is unable to locate the intended callee, then search engine 57 preferably indicates to context inference service 56 that the intended callee is unavailable. Context inference service 56 may then automatically transfer the call to a context based backup. In addition, context inference service 56 may prompt the caller to select from among multiple context based backups where multiple backups are available for the call.

In addition, in the present invention, a caller may request a line number for the call. In that case, intermediary device preferably transfers the call via a voice channel and the call context via a signal channel a destination service provider, where a destination call register 52 is established to terminate the call.

The destination service provider then transfers a signal to destination device 44 to announce the call. If the destination service provider determines that call will not be answered, the destination service provider preferably responds to the call according to the context based backup selected by the context inference service. In particular, the destination service provider may transfer the call to another destination service provider for the context based backup.

The context information for the call is also transferred to destination device 44, such that the callee is provided with a context for the call. The context information available in destination call register 52 may be filtered prior to transmittal to destination device 44 according to filtering preferences associated with the device, a line subscriber, or the callee. In addition, destination device 44 may filter the context displayed to a callee according to the device capabilities and preferences selected for the device.

Current relevant events for a callee may be determined as part of the context of a call. In particular, an electronic calendar may be accessed according to a callee identity from a caller profile or from an external calendaring data management system. In addition, where other devices are detected within a local network area of the origin device 40, electronic schedules and other event information may be accessed about a current event for the caller from the other devices or according to the identities of other parties participating in an event with the caller.

For the present invention, a current relevant event may include a meeting, appointment, location, others involved in the event, duration of the event, and other information that describes the previous, current, or future environments in which a callee may be located. Scheduling may be utilized as a criteria for a backup callee. For example, if a callee is detected on vacation, any calls received except from a select group of callers will automatically be transferred to a backup during a vacation time, while that individual may not be a backup with the callee is at work. In another example, a history of talking times with different callers may be recorded, such that when a caller is detected, an estimated amount of time needed for the conversation with the caller may be determined and compared with the amount of time the callee has available on a calendar. If the callee does not have the estimated time available, then the call is transferred to a callee backup.

In one embodiment, a line may be answered by someone who is not the intended callee. In that case, the caller may continue the call or request to be transferred to a context based backup by entering a voice command or keypad entry. In addition, where the caller has provided an intended callee identity with the call request, if the RVID of the callee answering the call is not that of the intended callee, then a call transfer may be automatically invoked, with a message output to the callee indicating the reason for the transfer.

In particular, where multiple backups may be selected for the context of the call, the backups may be called sequentially and the call transferred to the first available backup, or the caller may be prompted to select from among the backups.

In another embodiment, where a backup is a messaging service, the messaging service preferably receives the call context, including other context based backups, such that the messaging service may offer the caller with options to select one of the other available context based backups.

According to an advantage of the present invention, telephony devices may be equipped with selectable options, such that individuals may select an option indicating that the caller is unavailable. When a call is received at the telephony device, the device preferably returns the unavailable signal, such that the destination service provider may automatically transfer the call to a context backup.

In a private switching network context, intermediary device 42 preferably functions as the private switching network enabled to detect context for a call and transfer the call to a backup at a line number not managed by the private switching network. Where backup transfers are made within the private switching network, it is advantageous to indicate to the caller that a transfer is being made and the name of the callee, but not to provide the line number of the callee to which the transfer is made in order to maintain the privacy of the callee.

According to other advantages of the present invention, the destination service provider may initiate at least one of context inference service 51 and context inference service 56 to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the identity of the callee answering the call is preferably authenticated and profiles accessed for the line line subscriber and/or callee. Returning an RVID determined for the callee to the caller is advantageous because the RVID preferably includes the callee name and information about the transfer.

Figure 4:
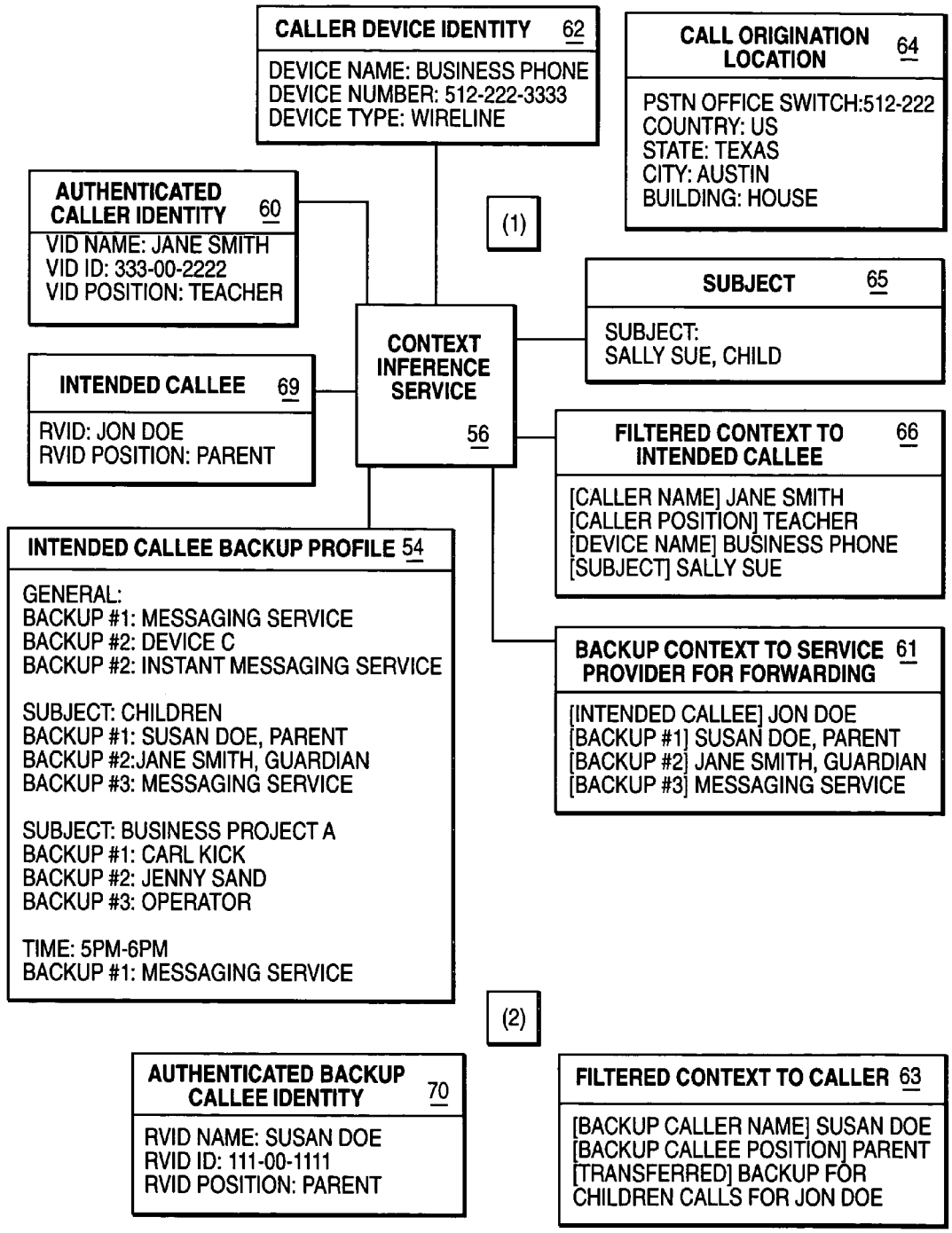
FIG. 4 illustrates an illustrative example of a context based caller backup selection in accordance with the method, system, and program of the present invention.

Referring now to FIG. 4, there is depicted an illustrative example of a context based caller backup selection in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by a caller AJane Smith@ to an intended callee AJon Doe@. Authenticated caller identity 60 preferably provides context for who is placing the call. Intended callee 69 preferably provides context for who is intended to receive the call. Alternate types of identification may be authenticated for the caller and intended callee.

A caller device identity 62 is preferably determined from line subscriber information. In particular, the device name, line number utilized by the device, and device type are included. An intended callee may designate certain backups for wireless call and other backups for wireline calls, for example.

A call origination location 64 is preferably determined from a GPS position detected, from a geographical area supported by a service provider, from a caller schedule indicating a scheduled location, and other location related information accessible for a call. An intended callee may designate certain backups for calls received from one geographical area and other backups for calls received from another geographical area, for example.

A subject 65 is preferably determined from a scheduled event, from a type of device utilized, from the location of the caller, from previous subjects, and from caller selected subjects. In addition, subjects may be inferred. In the present example, the caller may select a particular student from a list of students about which the subject of the call pertains. In addition, the caller profile may store a list of children and their parents, where a call to a parent infers the name of the child as a subject. An intended callee may designate backups for different call subjects.

An intended callee backup profile 54 is preferably accessed from a callee profile according to an intended callee identifier. In the example, the intended callee, Jon Doe, has selected general backups and backups specified according to subject and time of day. In the example, the RVIDS of backup callees are provided, such that access information for each backup callee is accessible. Where a messaging service is an initial backup, the messaging service preferably receives context indicating other available backups and provides the caller with the option to leave a message, send a text message, or context one of the other selected backups. Where the backup is an instant messaging service, the service preferably prompts the intended callee with an instant message at whatever computing system the intended callee is currently logged onto.

For the present call, the subject is a child. Preferably, the backups selected by the intended callee for the subject Achildren@ will be accessed. Preferably, as illustrated, an intended callee may rank the order in which the backup parties are accessed. Here, another parent, Susan Doe, is preferably accessed first as a backup when Jon Doe is not available.

Context inference service 56 preferably filters the context output according to the entity receiving the context. For example, filtered context to the intended callee 66 includes the caller name, caller position, device name and subject of the call. If the callee answers the call, then the caller VID and context are transferred to the intended callee. In addition, whether or not the callee answers, the filtered context is preferably stored in the profile for the intended callee according to the intended callee RVID. Further, the filtered context may be recorded and stored by a call management service that monitors and records call information for billing and verification purposes.

In addition, context inference service 56 may filter backup context 61 provided to the service provider for transferring or forwarding the call. In particular, the backup context may be transmitted in addition to other context for the call, but is distinguished in the present invention for illustrative purposes. Backup context 61 indicates the intended callee and the context based backups selected for the intended callee, where the context is children. The origin service provider, destination service provider, or a forwarding service preferably utilizes backup context 61 to control transferring or forwarding of a call in the event that the intended callee is unavailable. In addition, context inference service 56 may facilitate transferring or forwarding the call from an intended callee service provider to a backup callee service provider.

For purposes of the present invention, the intended callee is unavailable and the call is transferred to Susan Doe, according to backup context 61. Context inference service 56 preferably receives and determines an authenticated backup callee identity 70, including an RVID name, RVID ID and RVID position. Filtered context to the caller 63 includes the backup callee name, backup callee position, and transfer path description. In the present invention it is advantageous to transfer filtered context including a forwarding path to the caller when the call is automatically forwarded to a backup. In addition, since the call may be transferred to a line where multiple callees may answer the call, it is important to provide the caller with verification that the current callee is the expected backup callee.

In particular, in addition to loading the intended callee backup preferences, a billing plan for the intended callee may be accessed from the intended callee profile. Advantageously, even though a call is transferred, the intended callee may elect to pay for any charges incurred by the backup callee for the call according to a callee billing plan. In addition, the intended callee may agree to pay for a portion of incurred charges. The billing plan preferably includes service and account provider selections, where accounts with providers are accessible according to the intended callee RVID.

Figure 5:
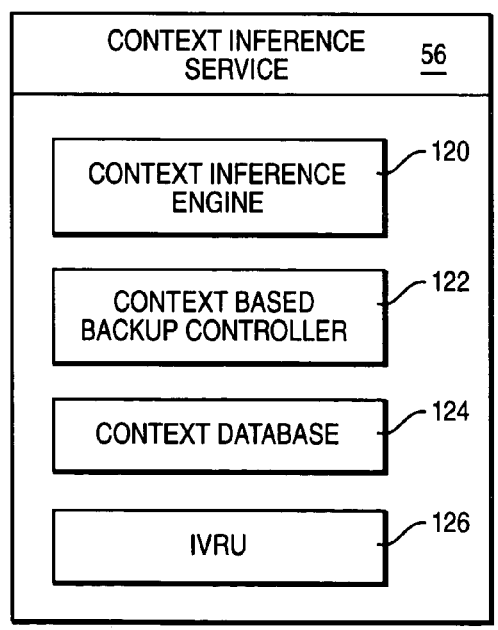
FIG. 5 depicts a block diagram of a context inference service in accordance with the method, system, and program of the present invention.

With reference now to FIG. 5, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 120. Context inference engine 120 preferably determines the context for a call through information accessible for the call and through inferences from that information. In addition, context inference engine 120 may filter context information for each entity receiving that information.

In the present invention, determining a context for a call is particularly advantageous because backups for an intended callee may be automatically selected according to the context of the call. A context based backup controller 122 preferably facilitates context based backup selections according to backup preferences of an intended callee and/or the backup preferences assigned to a particular line number. Context based backup controller 122 may also facilitate querying backup callee parties for availability before transferring the call to an available backup party. Moreover, context based backup controller 122 may be initiated before or after it is determined that the intended callee is unavailable.

A context database 124 preferably records and stores context for each call processed by context inference service 56. Context database 124 may be later accessed to provide verification and context for billed call transactions. In addition, context database 124 may be accessed by context inference engine 120 or context based backup controller 122 when determining context and context backups, according to previous context.

An interactive voice recognition unit (IVRU) 126 preferably prompts the caller and callee to provide information required for determining context and detects caller or callee entries. In addition, IVRU 126 preferably prompts the caller and callee to select from among multiple context based backups and detects selections.

Figure 6A:
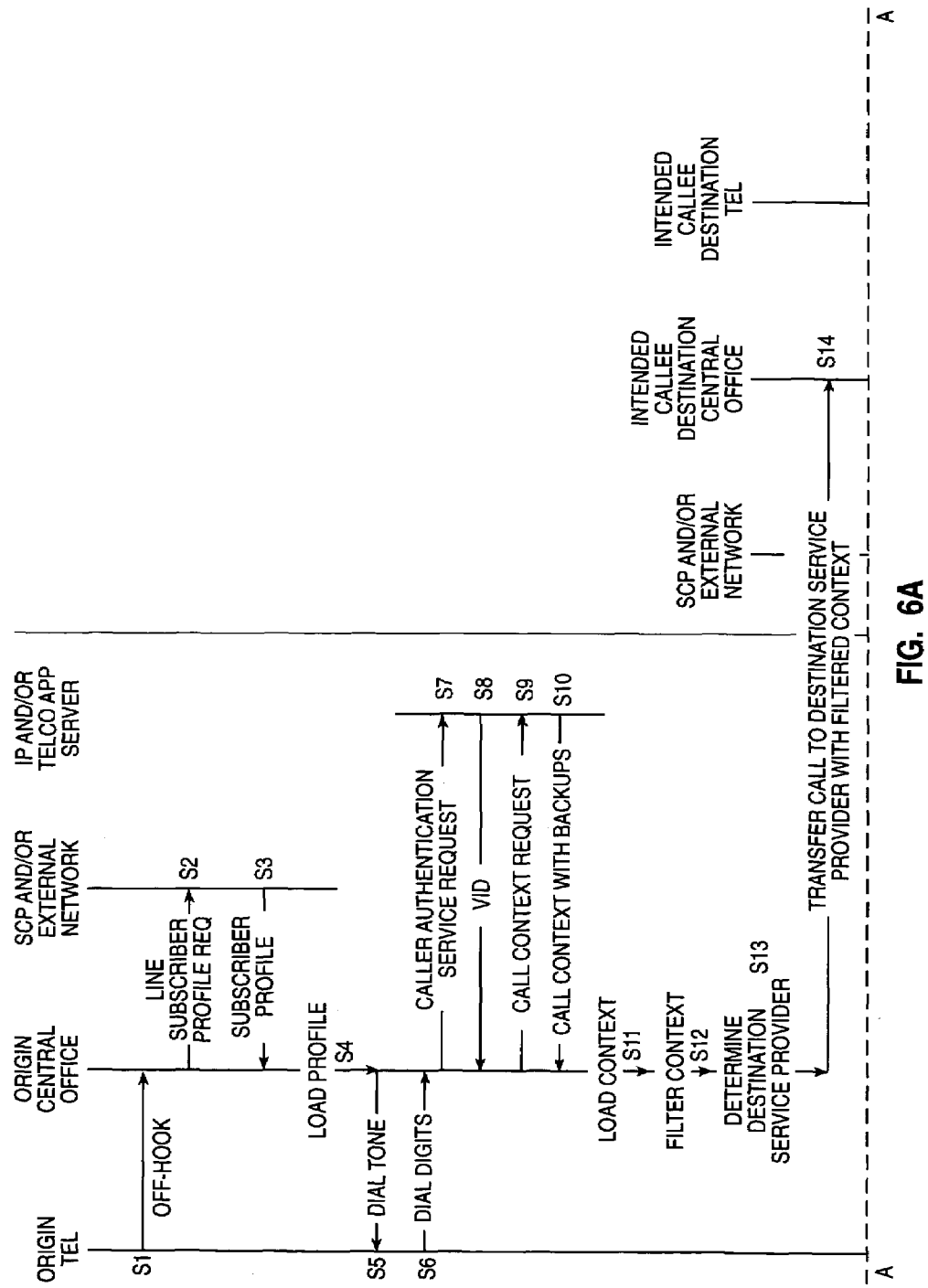
FIG. 6 illustrates a flow diagram of a signal flow and processing of a call in accordance with the method, system, and program of the present invention.
Figure 6B:
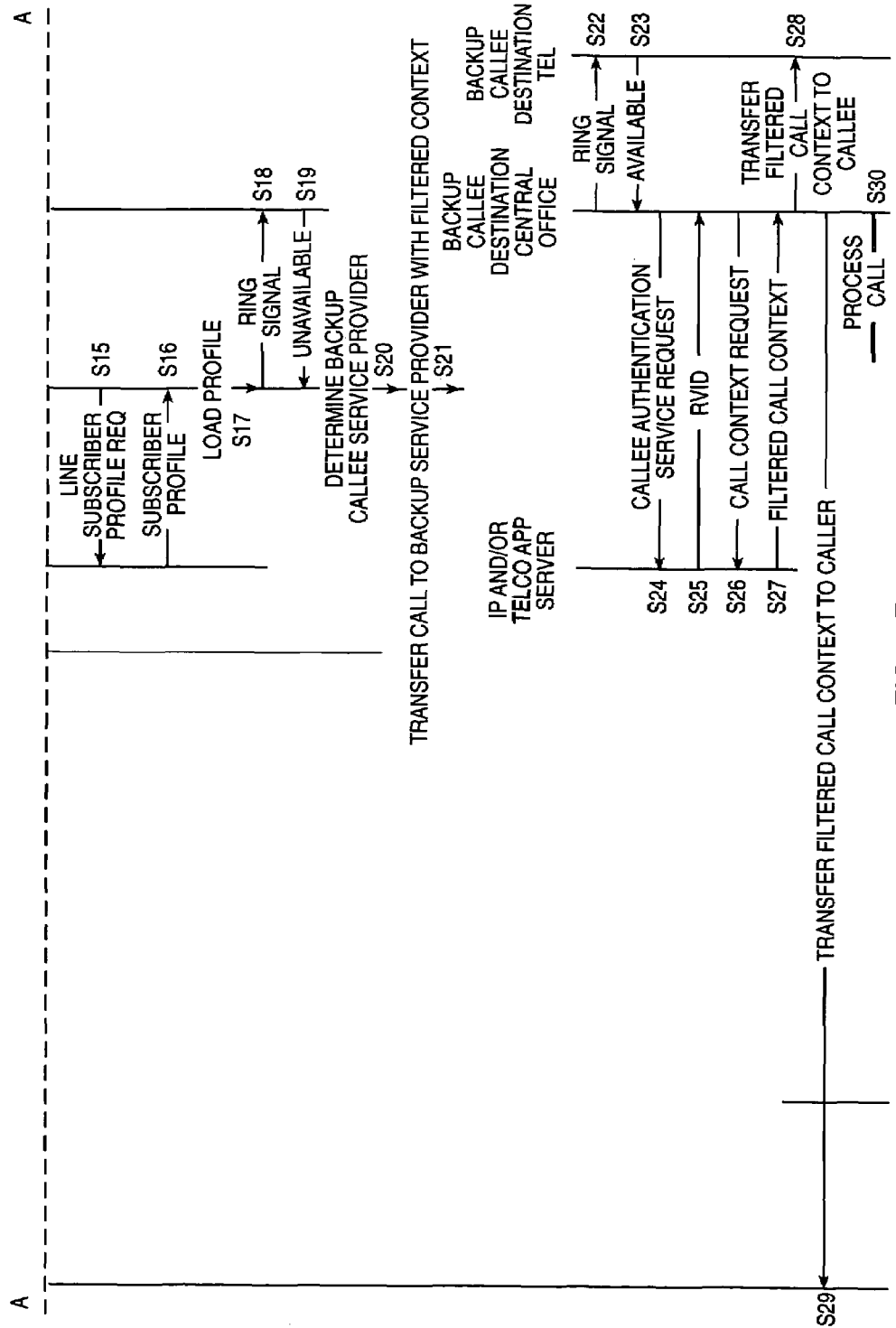

Referring now to FIG. 6, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. In addition, a caller may provide an intended callee identifier. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

Thereafter, the central office extends a call context request to a context inference service available from an IP or telco application server (step S9). The context inference service preferably accesses and loads a caller profile according to VID into the origin call register. Utilizing the line number, line subscriber profile, VID and caller profile, the context inference service preferably determines a context for the call. In addition, the context inference service may access a backup profile for an intended callee or intended line subscriber and determine context based call backups should the intended callee or line subscriber not be available. The intended callee profile may also indicate forwarding preferences designating whether the call should be automatically forwarded to the context based backups. Where automatic forwarding is selected, the context preferably selects a forwarding backup party identifier.

The context inference service preferably filters the context and designates certain portions of the context for receipt by certain entities. The call context is returned to the origin central office (step S10).

Next, the context is loaded into the call register (step S11). In addition, the context is filtered and distributed according to the entities receiving the context (step S12). In particular, an IP or telco application server provide a filtering service.

A destination service provider for the call according to the dialed digits is determined from a directory (step S13). Next, the call is transferred to the destination service provider with filtered context (step S14). Alternatively, a search engine may send out queries to multiple line numbers searching for the callee.

Upon receiving a call at a destination service provider central office, a call register is established for the call and the line subscriber profile request is initiated to a SCP or external network database (step S15). The line subscriber profile is returned to the central office (step S16) and loaded into the call register (step S17).

Next, a ring signal is extended to the destination device (step S18). Here, an indication that the intended callee is unavailable is returned (step S19). An unavailability signal may be generated by the telephony device according to a callee setting on the telephony device indication that the intended callee is Aaway from the desk@, Aout to lunch@, or otherwise unavailable. In addition, after a particular number of rings, if the call is not answered the telephony device may generate such as signal. Moreover, the central office may determine unavailability after a particular number of rings. Further, if the person answering the phone is not the intended callee, then unavailability may be determined. In response to detecting unavailability, the backup callee service provider is preferably determined (step S20). The call is then transferred to the backup service provider with filtered context (step S21).

The line subscriber profile for the backup party may be accessed, if the backup party is another callee. The backup party may also include a messaging service for voice, text, or instant messaging. After loading a profile, a ring signal is preferably extended to the backup callee device (step S22) and for purposes of the present example, the call is answered and an availability signal is returned to the backup callee destination central office (step S23).

A callee authentication request is extended to an IP or telco application server (step S24). Alternatively, the destination device or origin device may initiate the callee authentication. An RVID containing the authenticated identity of the backup callee is returned to the backup callee destination central office (step S25).

Next, a call context request is extended to an IP or telco application server (step S26). A context inference service preferably adds to the context of the call according to backup callee profile information. A filtered call context is returned to the backup callee destination central office (step S27).

The filtered call context may then be transferred to the callee (step S28). Additionally, filtered call context may be transferred to the callee with a ring signal or at other times during the process. In addition, the filtered call context is preferably transferred to the caller to identify the callee and indicate the path of the call (step S29).

The call may then be processed according to the current call context (step S30). In particular, the call context may include billing plan selections, including sharing telephone service billing between the caller, the intended callee and the backup callee. In addition, the intended caller may transfer a payment to the backup callee for receiving transferred calls. The intended callee backup profile may include authorization for such a transfer or the backup callee may require such a transfer.

Figure 7:
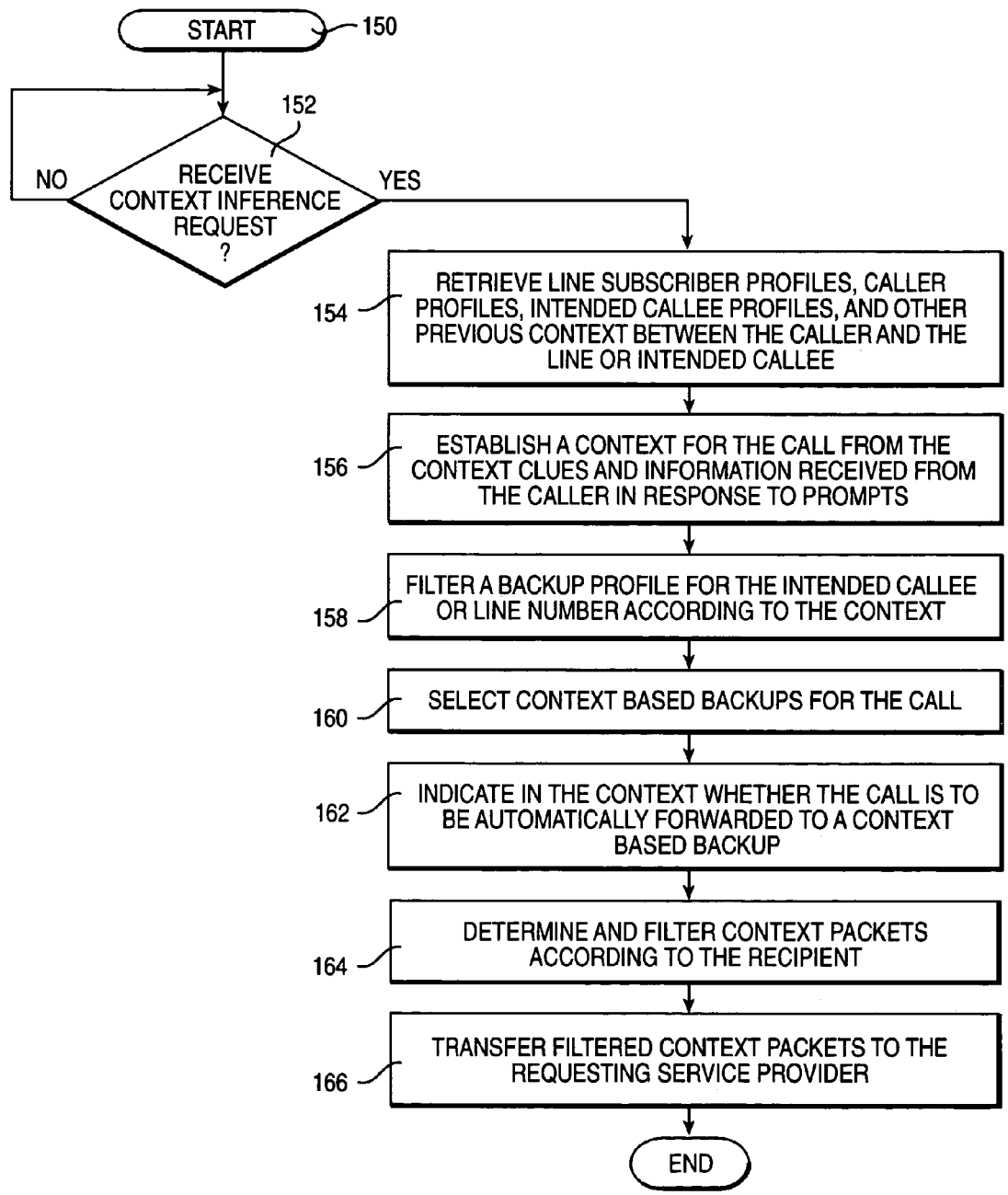
FIG. 7 depicts a high level logic flowchart of a process and program for controlling a context inference service in accordance with the method, system, and program of the present invention.

With reference now to FIG. 7, there is depicted a high level logic flowchart of a process and program for controlling a context inference service in accordance with the method, system, and program of the present invention. As illustrated, the process starts at block 150 and thereafter proceeds to block 152. Block 152 depicts a determination as to whether or not a context inference request is received. If a context inference request is not received, then the process iterates at block 152. If a context inference request is received, then the process passes to block 154.

Block 154 illustrates retrieving the line subscriber profiles, caller profiles, intended callee profiles, and other previous context between the caller and the line or intended callee. Next, block 156 depicts establishing a context for the call from the context clues retrieved and from information received from the caller in response to prompts for information needed to determine a full call context.

Next, block 158 illustrates filtering a backup profile for the intended callee or line number according to the context. In particular, the backup profile may include backup parties designated according to context characteristics. Block 160 depicts selecting the context based backups for the call. Thereafter, block 162 illustrates indicating in the context whether the call is to be automatically forwarded to a context based backup. Preferably the intended callee may set a preference for automatic forwarding according to context or in general in the intended callee profile.

Thereafter, block 164 depicts determining and filtering context packets according to each recipient. In particular, some context information may be advantageous to transfer to the caller while other context information, such as backup party references, may be more advantageous to transfer to a service provider handling the call. Next, block 166 illustrates transferring the filtered context packets to the requesting service provider for distribution, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for determining a call backup, comprising:
   detecting a context for a call from a caller to an intended callee, said context further comprising data elements representing a subject mailer of said call, an event of said call, a time period of said call, a location of said call, and a type of device utilized by said caller in said call;
   automatically selecting at least one backup party from among a plurality of backup parties to said intended party according to said context for said call; and
   responsive to detecting said intended callee as unavailable, automatically facilitating transfer of said call from said intended callee to said at least one backup party.

2. The method for determining a call backup according to claim 1, further comprising:
   receiving a request for a selection of at least one backup party.

3. The method for determining a call backup according to claim 1, further comprising:
detecting a context for said call at a context inference service executing within a trusted telephone network handling said call.

4. The method for determining a call backup according to claim 1, further comprising:
detecting a context for said call at a context inference service executing outside a trusted telephone network handling said call.

5. The method for determining a call backup according to claim 1, further comprising:
automatically facilitating forwarding said call to said at least one backup party.

6. The method for determining a call backup according to claim 1, further comprising:
searching for said intended callee among at least one line number according to an identity of said intended callee; and
responsive to not detecting said intended callee at said at least one line number, automatically facilitating transfer of said call from said intended callee to said at least one backup party.

7. The method for determining a call backup according to claim 1, further comprising:
accessing a backup profile comprising a plurality of backup parties designated according to context for said intended callee; and
filtering said plurality of backup panics according to said context for said call.

8. The method for determining a call backup according to claim 1, wherein said at least one backup party provides backup for a subject matter of said call context.

9. The method for determining a call backup according to claim 1, wherein said at least one backup party provides backup for an event of said call context.

10. The method for determining a call backup according to claim 1, wherein said at least one backup party provides backup for a time period of said context.

11. The method for determining a call backup according to claim 1, wherein said at least one backup party provides backup for a location of said caller in said call context.

12. The method for determining a call backup according to claim 1, wherein said at least one backup party provides backup fix a type of device utilized by said caller in said call context.

13. The method for determining a call backup according to claim 1, wherein said at least one backup party comprises at least one individual.

14. The method for determining a call backup according to claim 1, wherein said at least one backup party comprises a business entity.

15. The method for determining a call backup according to claim 1, wherein said at least one backup party comprises a voice messaging service.

16. The method for determining a call backup according to claim 1, wherein said at least one backup party comprises a text messaging service.

17. The method for determining a call backup according to claim 1, wherein said at least one backup party comprises an instant messaging service.

18. The method for determining a call backup according to claim 1, further comprising:
facilitating transfer of said call to a messaging service, wherein said messaging service provides said caller with a plurality of options comprising at least one from among leaving a message and selecting to transfer to another backup party.

19. The method for determining a call backup according to claim 1, further comprising:
sharing payment for telephone service costs fin said call between said intended callee and said at least one backup party.

20. The method for determining a call backup according to claim 1, further comprising:
transferring a payment from said intended callee to said at least one backup party for answering said call.

21. The method for determining a call backup according to claim 1, wherein said intended callee is an individual different from a line subscriber for a line number requested.

22. The method for determining a call backup according to claim 1, wherein said intended callee is a line subscriber for a line number requested.

23. The method for determining a call backup according to claim 1, wherein said call context is determined at least one from among an authenticated identity of said caller, a profile for said caller, a profile for a line subscriber, a profile for said intended callee, and a profile for a device utilized by said caller.

24. The method for determining a call backup according to claim 1, wherein said call context comprises at least one from among, an identity of said caller, an identity of a line subscriber, an identity of said intended callee, said at least one backup party, a subject of said call, a location of origination of said call, an identity of a device utilized to place said call, a billing plan of said caller, a billing plan of said intended callee, and a billing plan of said at least one backup party.

25. A system for determining a call backup, comprising:
a context inference service server communicatively connected to a misted telephone network;
means for detecting a context for a call from a caller to an intended callee at said context inference service server, said context further comprising data elements representing a subject matter of said call, an event of said call, a time period of said call, a location of said call, and a type of device utilized by said caller in said call;
means for automatically selecting at least one backup party from among a plurality of backup parties to said intended party according to said context for said call; and
means responsive to detecting said intended callee as unavailable, for automatically facilitating transfer of said call from said intended callee to said at least one backup party.

26. The system for determining a call backup according to claim 25, further comprising:
means for receiving a request for a selection of at least one backup party.

27. The system for determining a call backup according to claim 25, further comprising:
means for detecting a context for said call at a context inference service executing within said trusted telephone network handling said call.

28. The system for determining a call backup according to claim 25, further comprising:
means for detecting a context for said call at a context inference service executing outside said trusted telephone network handling said call.

29. The system for determining a call backup according to claim 25, further comprising:

means for automatically facilitating forwarding said call to said at least one backup party.

30. The system for determining a call backup according to claim 25, further comprising:
means for searching for said intended callee among at least one line number according to an identity of said intended callee; and
means responsive to not detecting said intended callee at said at least one line number, for automatically facilitating transfer of said call from said intended callee to said at least one backup party.

31. The system for determining a call backup according to claim 25, further comprising:
means for accessing a backup profile comprising a plurality of backup parties designated according to context for said intended callee; and
means for filtering said plurality of backup parties according to said context for said call.

32. The system for determining a call backup according to claim 25, wherein said at least one backup party provides backup for a subject matter of said call context.

33. The system for determining a call backup according to claim 25, wherein said at least one backup party provides backup for an event of said call context.

34. The system for determining a call backup according to claim 25, wherein said at least one backup party provides backup for a time period of said context.

35. The system for determining a call backup according to claim 25, wherein said at least one backup party provides backup for a location of said caller in said call context.

36. The system for determining a call backup according to claim 25, wherein said at least one backup party provides backup for a type of device utilized by said caller in said call context.

37. The system for determining a call backup according to claim 25, wherein said at least one backup party comprises at least one individual.

38. The system for determining a call backup according to claim 25, wherein said at least one backup party comprises a business entity.

39. The system for determining a call backup according to claim 25, wherein said at least one backup party comprises a voice messaging service.

40. The system for determining a call backup according to claim 25, wherein said at least one backup party comprises a text messaging service.

41. The system for determining a call backup according to claim 25, wherein said at least one backup party comprises an instant messaging service.

42. The system for determining a call backup according to claim 25, further comprising:
means for facilitating transfer of said call to a messaging service, wherein said messaging service provides said caller with a plurality of options comprising at least one from among leaving a message and selecting to transfer to another backup party.

43. The system for determining a call backup according to claim 25, further comprising:
means for sharing payment for telephone service costs for said call between said intended callee and said at least one backup party.

44. The system for determining a call backup according to claim 25, further comprising:
means for transferring a payment from said intended callee to said at least one backup party for answering said call.

45. The system for determining a call backup according to claim 25, wherein said intended callee is an individual different from a line subscriber for a line number requested.

46. The system for determining a call backup according to claim 25, wherein said intended callee is a line subscriber for a line number requested.

47. The system for determining a call backup according to claim 25, wherein said call context is determined at least one from among an authenticated identity of said caller, a profile for said caller, a profile for a line subscriber, a profile for said intended callee, and a profile for a device utilized by said caller.

48. The system for determining a call backup according to claim 25, wherein said call context comprises at least one from among, an identity of said caller, an identity of a line subscriber, an identity of said intended callee, said at least one backup party, a subject of said call, a location of origination of said call, an identity of a device utilized to place said call, a billing plan of said caller, a billing plan of said intended callee, and a billing plan of said at least one backup party.

49. A computer program product for determining a call backup, comprising:
a recording medium;
means, recorded on said recording medium, for detecting a context for a call from a caller to an intended callee, said context further comprising data elements representing a subject matter of said call, an event of said call, a time period of said call, a location of said call, and a type of device utilized by said caller in said call;
means, recorded on said recording medium, for automatically selecting at least one backup party from among a plurality of backup parties to said intended party according to said context for said call; and
means, recorded on said recording medium, responsive to detecting said intended callee as unavailable, for automatically facilitating transfer of said call from said intended callee to said at least one backup party.

50. The computer program product for determining a call backup according to claim 49, further comprising:
means, recorded on said recording medium, for receiving a request for a selection of at least one backup party.

51. The computer program product for determining a call backup according to claim 49, further comprising:
means, recorded on said recording medium, for detecting a context for said call at a context inference service executing within said trusted telephone network handling said call.

52. The computer program product for determining a call backup according to claim 49, further comprising:
means, recorded on said recording medium, for detecting a context for said call at a context inference service executing outside said trusted telephone network handling said call.

53. The computer program product for determining a call backup according to claim 49, further comprising:
means, recorded on said recording medium, for automatically facilitating forwarding said call to said at least one backup party.

54. The computer program product for determining a call backup according to claim 49, further comprising:
means, recorded on said recording medium, for searching for said intended callee among at least one line number according to an identity of said intended callee; and
means, recorded on said recording medium, responsive to not detecting said intended callee at said at least one line number, for automatically facilitating transfer of said call from said intended callee to said at least one backup party.

55. The computer program product for determining a call backup according to claim 49, further comprising:
means, recorded on said recording medium, for accessing a backup profile comprising a plurality of backup parties designated according to context for said intended callee; and
means, recorded on said recording medium, for filtering said plurality of backup parties according to said context for said call.

56. The computer program product for determining a call backup according to claim 49, further comprising:
means, recorded on said recording medium, for facilitating transfer of said call to a messaging service, wherein said messaging service provides said caller with a plurality of options comprising at least one from among leaving a message and selecting to transfer to another backup party.

57. The computer program product for determining a call backup according to claim 49, further comprising:
means, recorded on said recording medium, for sharing payment for telephone service costs for said call between said intended callee and said at least one backup party.

58. The computer program product for determining a call backup according to claim 49, further comprising:
means, recorded on said recording medium, for transferring a payment from said intended callee to said at least one backup party for answering said call.

59. A method for controlling a call, comprising:
receiving a call request for a call at a service provider;
accessing a context for said call, wherein said context comprises one or more context based backup parties for said call and data elements representing a subject matter of said call, an event of said call, a time period of said call, a location of said call, and a type of device utilized by a caller in said call;
automatically selecting at least one context based backup party from among the one or more context based backup parties according to the context for the call; and
responsive to detecting that said call is unanswered, automatically transferring said call to the selected context based backup party for said call.

60. The method for controlling a call according to claim 59, wherein said call request comprises a request for a line number.

61. The method for controlling a call according to claim 59, wherein said call request comprises a request for a line number and an intended callee.

62. The method for controlling a call according to claim 59, wherein said call request comprises a request for an intended callee.

63. The method for controlling a call according to claim 59, wherein said at least one backup party comprises an individual.

64. The method for controlling a call according to claim 59, wherein said at least one backup party comprises a messaging service.

65. The method for controlling a call according to claim 59, wherein said context for said call is accessed from a context inference service executing within a trusted telephone network processing said call.

66. The method for controlling a call according to claim 59, wherein said context for said call is accessed from a context inference service executing outside a trusted telephone network processing said call.

67. A method for controlling a call path, comprising:
receiving a call request for a call to an intended callee;
accessing a context for said call, wherein said context comprises a request to automatically forward said call to one or more context based backup parties for said intended callee and data elements representing a subject matter of said call, an event of said call, a time period of said call, a location of said call, and a type of device utilized by a caller in said call;
automatically selecting at least one context based backup party from among the one or more context based backup parties according to the context for the call; and
responsive to detecting that said call is unanswered, forwarding said call to the selected context based backup party.

68. A method for controlling a telephony device, comprising:
detecting a context for a call from a caller to an intended callee utilizing a telephone device, wherein said context further comprises one or more backup parties and data elements representing a subject matter of said call, an event of said call, a time period of said call, a location of said call, and a type of device utilized by said caller in said call;
identifying at least one backup party from among the one or more backup parties according to the context for the call;
receiving in the telephony device the identified backup parties;
controlling output of the identified backup parties via an output interface accessible to said telephony device; and
responsive to detecting said intended callee as unavailable and to receiving from the telephony device a selection from among the identified backup parties, transferring said call to a switch providing service for said selected backup party.

* * * * *